(12) United States Patent
Link

(10) Patent No.: US 10,069,288 B1
(45) Date of Patent: Sep. 4, 2018

(54) SAFETY PLATE FOR ELECTRICAL BOXES

(71) Applicant: Jack Andre Link, Shingle Springs, CA (US)

(72) Inventor: Jack Andre Link, Shingle Springs, CA (US)

(*) Notice: Subject to any disclaimer, the term of this patent is extended or adjusted under 35 U.S.C. 154(b) by 0 days.

(21) Appl. No.: 15/810,257

(22) Filed: Nov. 13, 2017

(51) Int. Cl.
| | |
|---|---|
| *H02G 3/12* | (2006.01) |
| *H02G 3/14* | (2006.01) |
| *H01R 13/453* | (2006.01) |
| *E04B 2/74* | (2006.01) |
| *H01R 13/639* | (2006.01) |
| *H01H 23/04* | (2006.01) |
| *E04F 19/08* | (2006.01) |

(52) U.S. Cl.
CPC ............ *H02G 3/121* (2013.01); *E04B 2/7457* (2013.01); *H01R 13/453* (2013.01); *H01R 13/6395* (2013.01); *H02G 3/14* (2013.01); *E04F 19/083* (2013.01); *H01H 23/04* (2013.01)

(58) Field of Classification Search
CPC ........ H02G 3/121; H02G 3/14; H01R 13/453; H01R 13/6395; H01H 23/04; E04B 2/7457
USPC .......................................................... 174/66
See application file for complete search history.

(56) References Cited

U.S. PATENT DOCUMENTS

| | | | |
|---|---|---|---|
| 1,066,706 A | * | 7/1913 | Caine .................... H02G 3/121 220/3.4 |
| 6,159,034 A | | 12/2000 | Royer |
| 8,058,570 B2 | | 11/2011 | Solan |
| 9,059,577 B2 | | 6/2015 | Solan |

* cited by examiner

*Primary Examiner* — Dhirubhai R Patel
(74) *Attorney, Agent, or Firm* — Inventive Law Inc.; Jim H. Salter

(57) ABSTRACT

An apparatus and method for providing a safety plate for electrical boxes are disclosed. An example embodiment includes: a safety plate for electrical boxes including: a safety plate shielding portion configured to protect a rear surface of an electrical box adjacent to which the safety plate is installed; and a safety plate stud bracket configured to attach to a structural element of a building. An example embodiment further includes: a wire support attachable to the safety plate, the wire support including: a wire support top portion including wire support knockouts, which provide an opening through which electrical wiring can be inserted and supported; and a wire support arm portion including a channel providing a wire support safety plate attachment guide configured to engage with or slide over tangs of the safety plate.

11 Claims, 9 Drawing Sheets

METHOD FOR PROVIDING A
SAFETY PLATE FOR ELECTRICAL BOXES
-1000-

Obtain a safety plate having a safety plate shielding portion configured to protect a rear surface of an electrical box adjacent to which the safety plate is installed, a safety plate stud bracket configured to attach to a structural element of a building, and a safety plate wire support attachment mechanism.
-1010-

Obtain a wire support having a wire support top portion including wire support knockouts, which provide an opening through which electrical wiring can be inserted and supported, and a wire support arm portion including a channel providing a wire support safety plate attachment guide configured to engage with or slide over tangs of the safety plate.
-1020-

Attach the wire support safety plate attachment guide of the wire support to the safety plate wire support attachment mechanism of the safety plate to form a combined safety plate and wire support.
-1030-

Install the combined safety plate and wire support in a building using the safety plate stud bracket.
-1040-

End

Fig. 9

SAFETY PLATE FOR ELECTRICAL BOXES

COPYRIGHT

A portion of the disclosure of this patent document contains material that is subject to copyright protection. The copyright owner has no objection to the facsimile reproduction of the patent document or the patent disclosure, as it appears in the U.S. Patent and Trademark Office patent files or records, but otherwise reserves all copyright rights whatsoever. The following notice applies to the disclosure provided herein and to the drawings that form a part of this document: Copyright 2016-2017, Jack Andre Link; All Rights Reserved.

TECHNICAL FIELD

The disclosed subject matter relates to the field of electrical boxes used in building construction, and other applications using electrical boxes, outlets, or switches, and particularly although not exclusively, to an apparatus and method for providing a safety plate for electrical boxes.

BACKGROUND

Electrical boxes are commonly used in building construction. These electrical boxes can include wall boxes, outlet boxes, switch boxes, receptacle boxes, junction boxes, pattress boxes, surface-mounted boxes, electrical cabinets, or other types of electrical boxes used to join or route electrical wiring or to contain electrical components. In a common usage, electrical boxes can be mounted to studs within a wall and flush with drywall material attached to the studs. The electrical wiring can be routed within the wall and into a cavity in the electrical box through openings or knockouts provided in the electrical box. The electrical box can provide a means to connect outlets, switches, or the like to the electrical wiring in the cavity of the electrical box. Once the wiring is complete and the drywall or other wall surface material is attached, the electrical box becomes mostly obscured from view. It is known in the art to fabricate electrical boxes using molded construction from a non-metallic or non-electrically conductive material. Typically, electrical boxes are fabricated from plastic, polyvinyl chloride (PVC), or the like.

Although electrical boxes are useful for building construction, there can be a danger because of the inability to be able to view the installed electrical boxes once the building construction is complete. For example, a building occupant may put a sharp object into the wall to hang a picture and become electrocuted when the sharp object penetrates the rear surface of the electrical box. Because conventional electrical boxes are typically not fabricated to withstand such penetrations, there is an on-going risk of electrocution for building occupants.

BRIEF DESCRIPTION OF THE DRAWINGS

Embodiments are illustrated by way of example and not limitation in the figures of the accompanying drawings, in which:

FIG. 9 illustrates a flow diagram representing a sequence of operations performed in a method according to an example embodiment.

DETAILED DESCRIPTION

In the following detailed description, reference is made to the accompanying drawings that form a part hereof, and in which are shown, by way of illustration, specific embodiments in which the disclosed subject matter can be practiced. It is understood that other embodiments may be utilized and structural changes may be made without departing from the scope of the disclosed subject matter.

According to various example embodiments of the disclosed subject matter as described herein, there is disclosed, illustrated, and claimed an apparatus and method for providing a safety plate for electrical boxes. The example embodiments disclosed herein provide an apparatus, system, and method implemented as a safety plate for electrical boxes, which can be used in a variety of applications including building construction, electrical cabinets, or the like.

Figure 1:
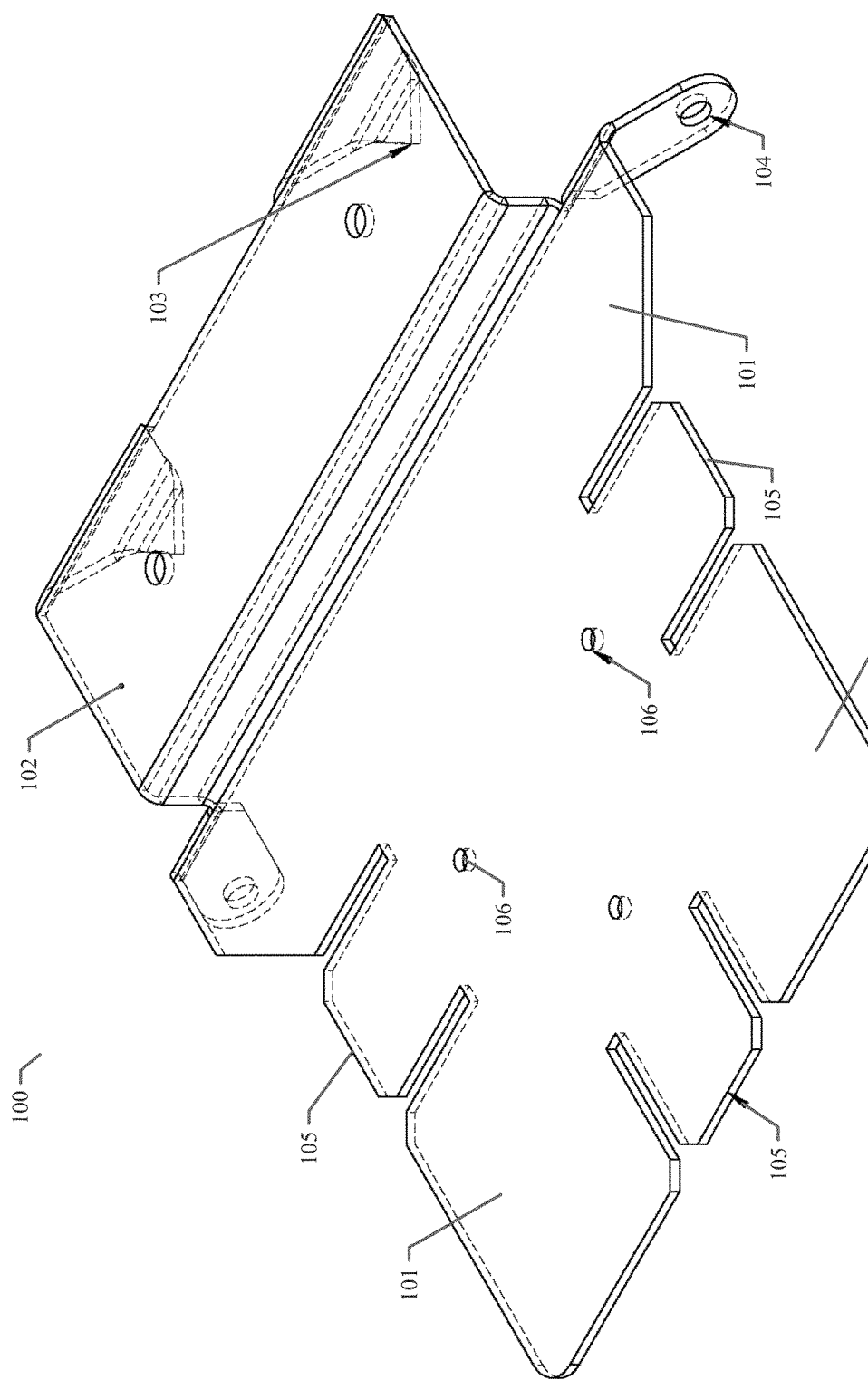
FIG. 1 illustrates a perspective top view of the safety plate of an example embodiment.

Referring now to FIG. 1, an example embodiment of the safety plate 100 is illustrated. FIG. 1 illustrates a perspective top view of the safety plate 100 of an example embodiment. The safety plate 100 of the example embodiment is shown to include a safety plate shielding portion 101 and a safety plate stud bracket 102. The safety plate shielding portion 101 is configured with a rigid panel or plate designed to protect the rear surface of an electrical box adjacent to which the safety plate 100 is installed. As such, the safety plate shielding portion 101 can be fabricated from metal, thick galvanized steel, hard plastic, or like material that is resistant to penetration by a sharp object. The safety plate stud bracket 102 is configured to attach to a wall stud or other structural element of a building. In particular, the safety plate stud bracket 102 of an example embodiment is configured to wrap over the side of a 2"×4" wooden stud. The safety plate stud bracket 102 includes safety plate stud coupling teeth 103 to bite into or attach to the side of a wooden stud and hold the safety plate 100 in place. The safety plate stud bracket 102 can also include holes for nails or screws to attach the safety plate 100 to a stud. The safety plate 100 can also include safety plate stud anchor wings 104 to anchor the safety plate 100 to the 2"×4" wooden stud with a regular sheet rock nails or screws.

In an example embodiment, the safety plate 100 can further include safety plate wire support attachment mechanism 105, which is configured as a plurality of cutout portions or tangs on the safety plate 100 to which an adjustable wire support 150 (shown in FIG. 2) can be attached and locked into place. Safety plate wire support attachment holes 106 are provided in the safety plate 100 to secure the wire support 150 to the safety plate 100 with a screw or bolt.

Figure 2:
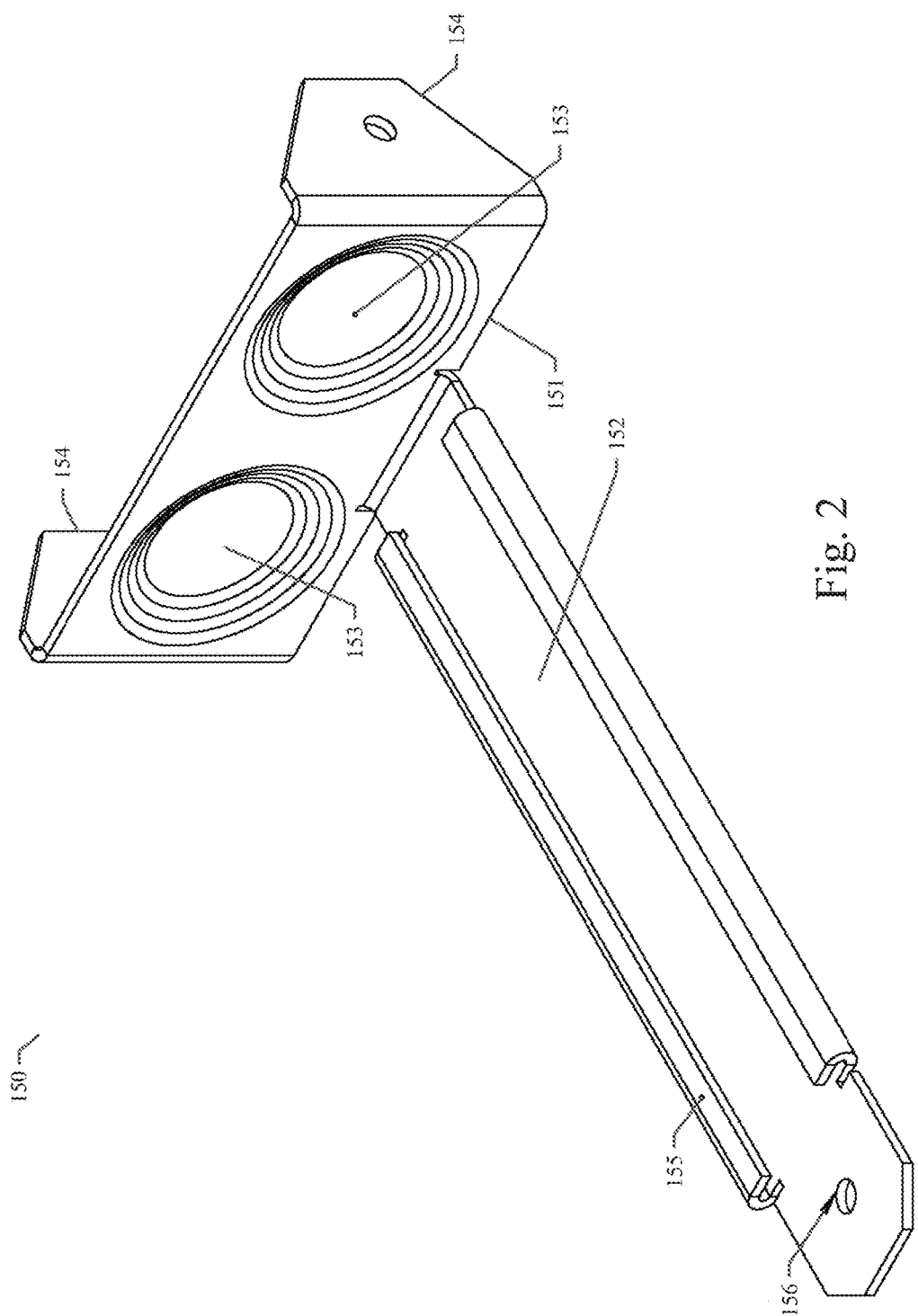
FIG. 2 illustrates a perspective front view of the wire support of an example embodiment.

Referring now to FIG. 2, an example embodiment of the wire support 150 is illustrated. FIG. 2 illustrates a perspective front view of the wire support 150 of an example embodiment. The wire support 150 is configured to attach to the safety plate 100 and provide support for electrical wiring that can be inserted into an electrical box adjacent to which the safety plate 100 is installed. The wire support 150 of an example embodiment includes a wire support top portion 151 and a wire support arm portion 152. The wire support top portion 151 includes wire support knockouts 153, which provide an opening through which electrical wiring can be inserted and supported thereby. In an example embodiment, the wire support knockouts 153 include two concentric openings ½" and/or ¾" for a plastic bushing or a wire retention mechanism to be inserted therein to support electrical wiring inserted through the bushing or wire retention mechanism. The wire support top portion 151 further includes a wire support stud bracket 154 configured to attach to a wall stud or other structural element of a building using nail or screw holes provided therein. The wire support top portion 151 is attached or integrated with the wire support arm portion 152 as shown in FIG. 2 in an example embodiment. The wire support arm portion 152 includes rolled edges or a channel to provide a wire support safety plate attachment guide 155 configured to engage with or slide over the tangs of the safety plate wire support attachment mechanism 105 of the safety plate 100. The rolled edges of the wire support safety plate attachment guide 155 also make the wire support arm portion 152 more rigid. The wire support arm portion 152 further includes wire support safety plate attachment hole 156 to secure the wire support 150 to the safety plate 100 via the safety plate wire support attachment holes 106.

Figure 3:
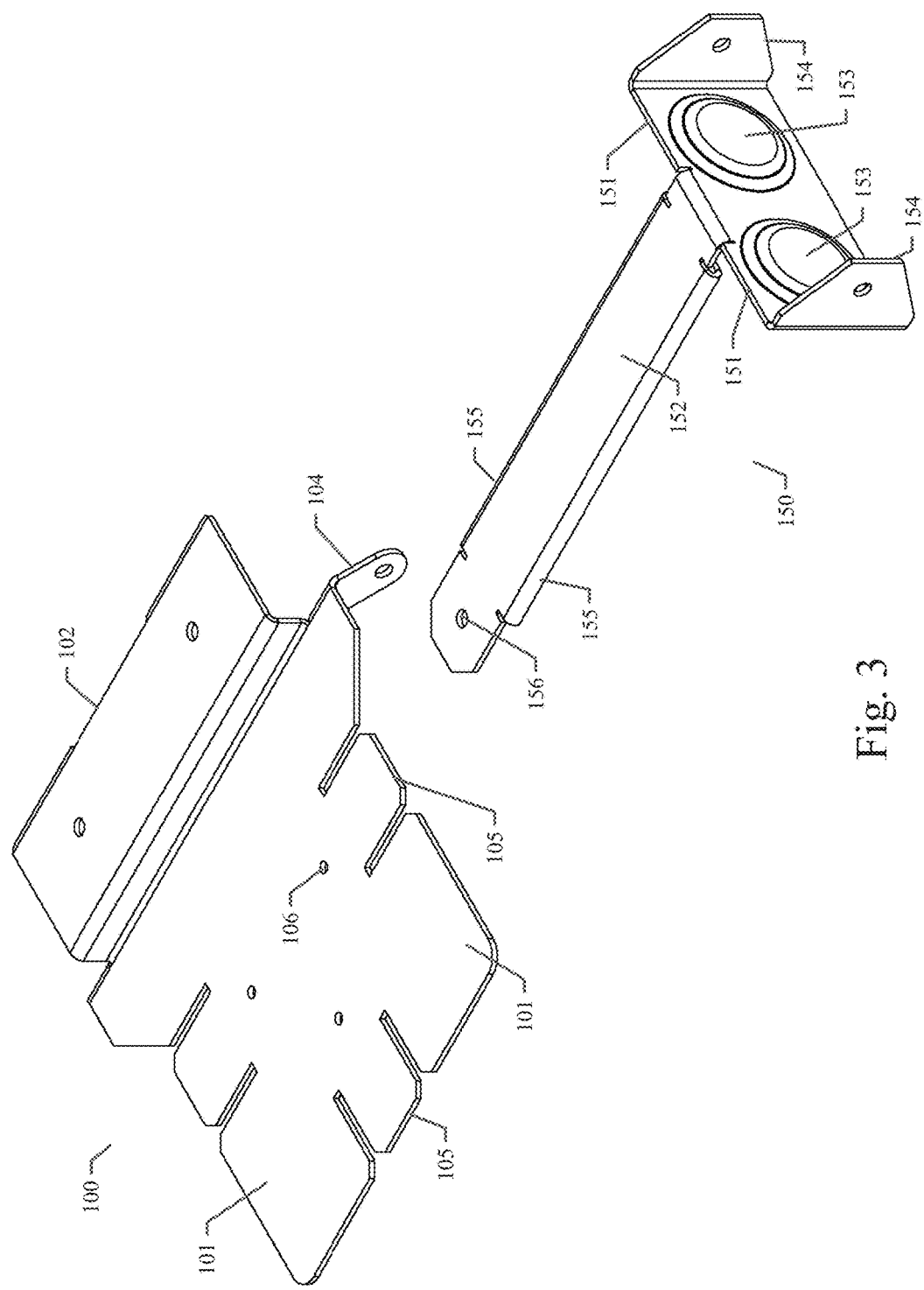
FIG. 3 illustrates how the wire support can be coupled to the safety plate in an example embodiment.

FIG. 3 illustrates how the wire support 150 can be coupled to the safety plate 100 in an example embodiment. As described above, the wire support safety plate attachment guide 155 can be configured to engage with or slide over the tangs of the safety plate wire support attachment mechanism 105 of the safety plate 100. Once the wire support safety plate attachment guide 155 is engaged width the safety plate wire support attachment mechanism 105, a screw or bolt inserted though the wire support safety plate attachment hole 156 and the safety plate wire support attachment hole 106 can be used to secure the wire support 150 to the safety plate 100. As such a combined safety plate and wire support apparatus can be formed.

Figure 4:
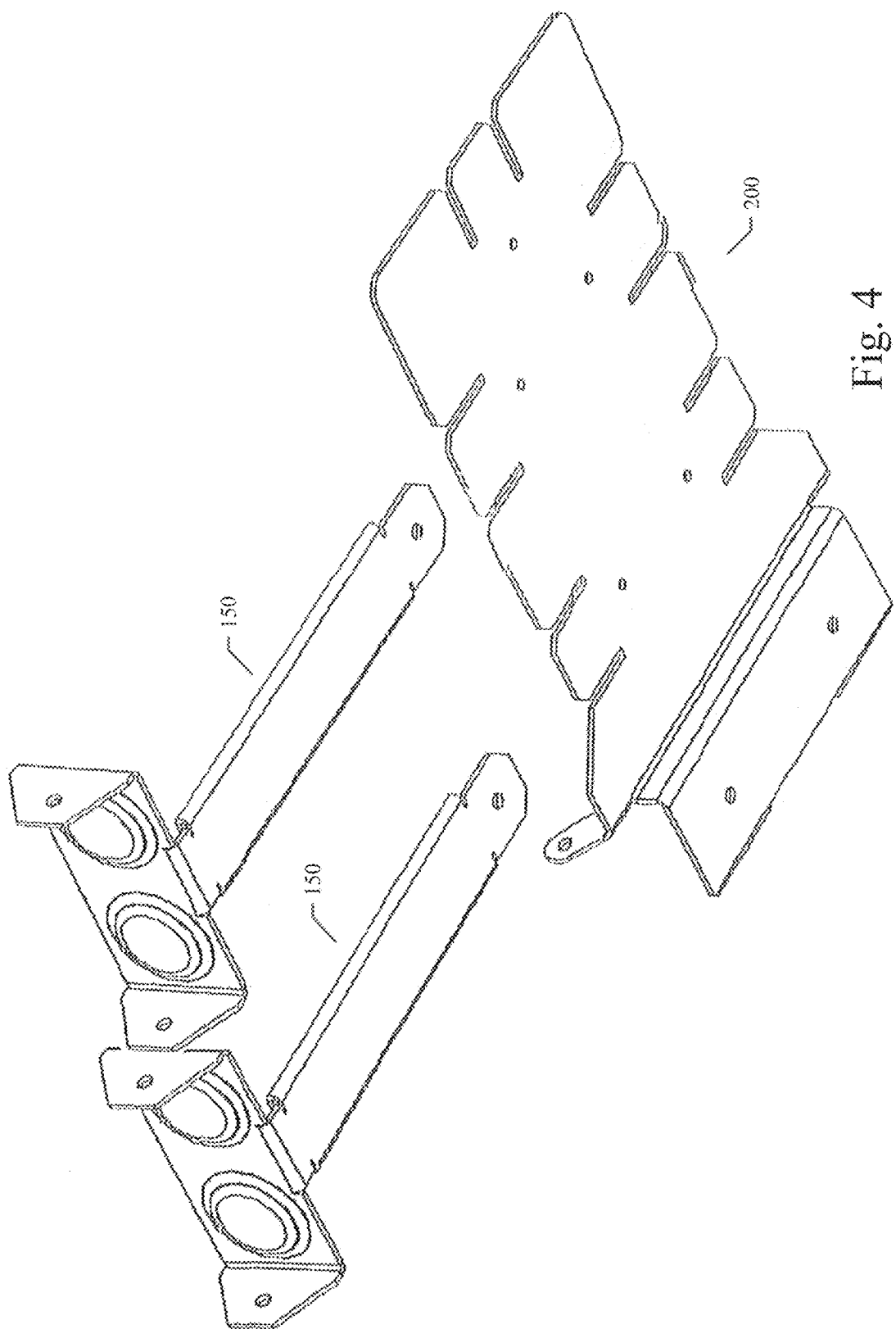
FIG. 4 illustrates how multiple wire supports can be coupled to a double-sized safety plate in an example embodiment.

FIG. 4 illustrates a double-sized safety plate 200 in an example embodiment. Double-sized safety plate 200 is configured with the same components of safety plate 100 as described above, except, double-sized safety plate 200 is configured for multiple wire supports 150 attached thereto. FIG. 4 illustrates how multiple wire supports 150 can be coupled to the double-sized safety plate 200 in an example embodiment. The double-sized safety plate 200 can be used to protect larger sized electrical boxes. It will be apparent to those of ordinary skill in the art in view of the disclosure herein that various sizes of the wire support 150 and the safety plate 100 can be equivalently implemented using the teachings herein.

Figure 5:
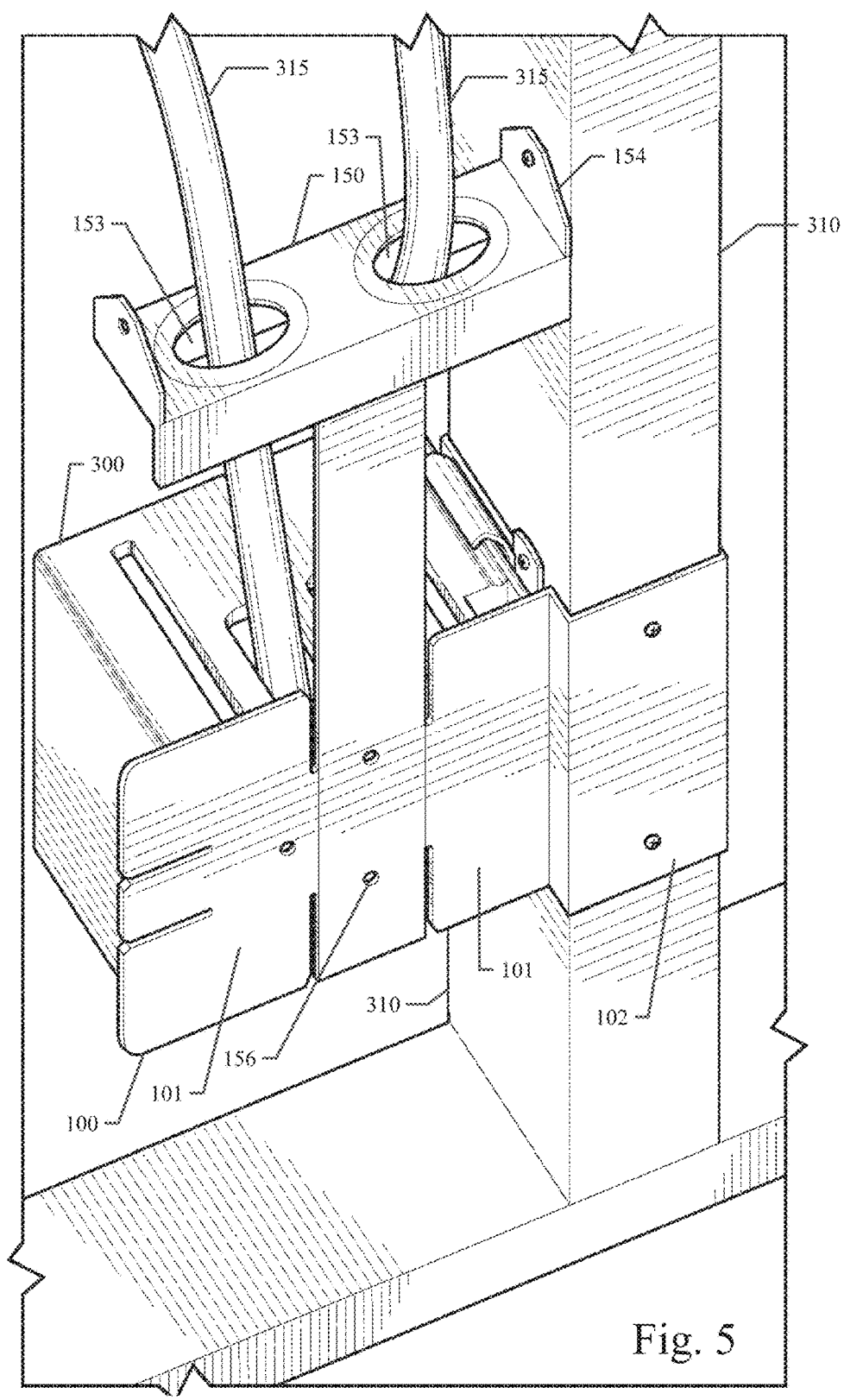
FIG. 5 illustrates a rear view showing how the combined wire support and safety plate can be coupled to a wall stud adjacent and parallel to the rear panel of an electrical box.
Figure 6:
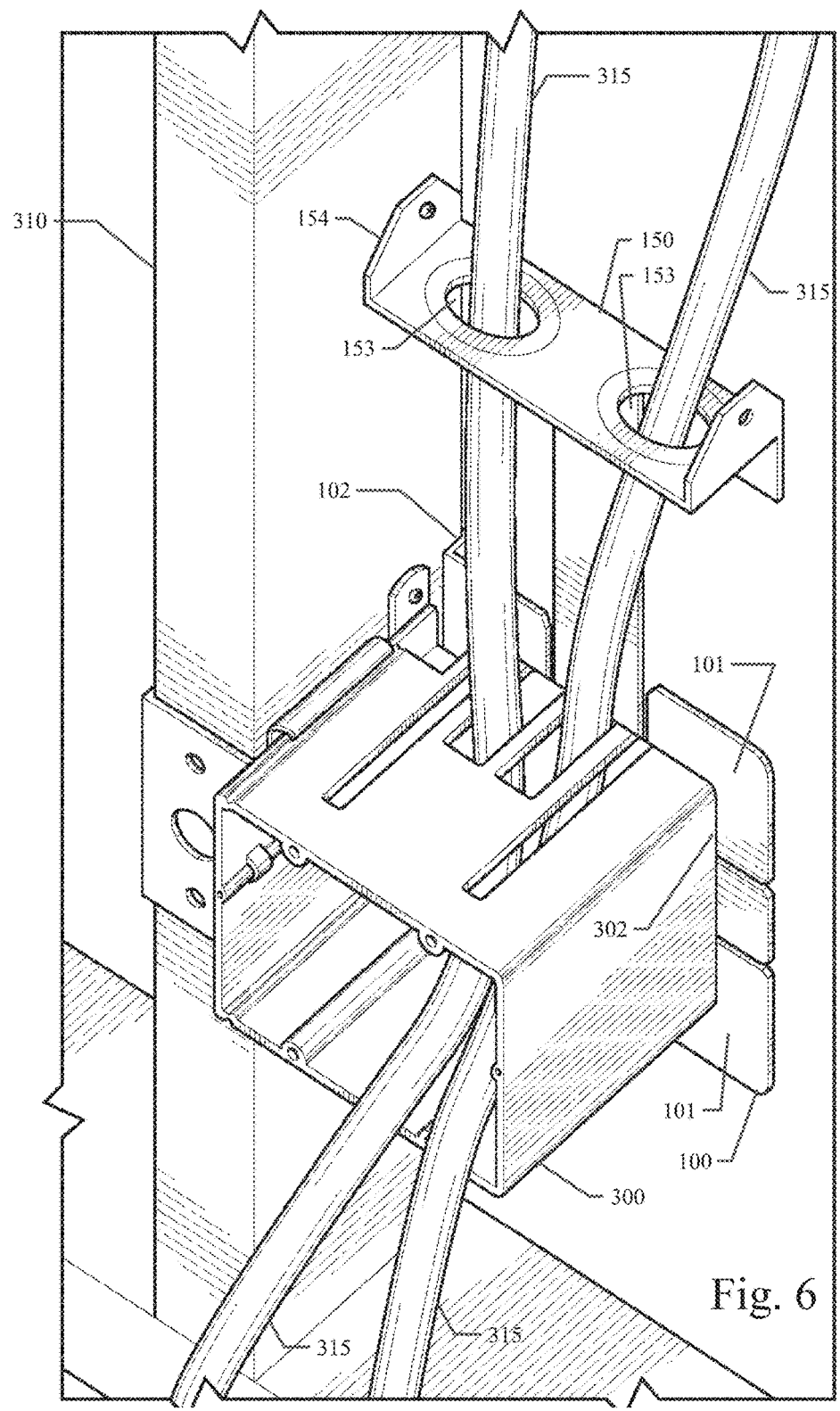
FIG. 6 illustrates a front view showing how the combined wire support and safety plate can be coupled to a wall stud adjacent and parallel to the rear panel of an electrical box.

FIG. 5 illustrates a rear view showing how the combined wire support 150 and safety plate 100 can be coupled to a wall stud 310 adjacent and parallel to the rear panel of an electrical box 300. FIG. 6 illustrates a front view of the same installed configuration of the combined wire support and safety plate coupled to a wall stud 310 adjacent and parallel to the rear panel 302 of the electrical box 300. FIGS. 5 and 6 show the combined wire support 150 and safety plate 100 coupled to the wall stud 310 via the safety plate stud bracket 102 and the wire support stud bracket 154, both of which being attached to the wall stud 310 with nails or screws. The wire support 150 is coupled to the safety plate 100 via a screw or bolt inserted through wire support safety plate attachment hole 156 and safety plate wire support attachment hole 106 FIGS. 5 and 6 also show how the electrical wiring 315 to/from the electrical box 300 can be inserted through and supported by the wire support knockouts 153. In the installed configuration shown in FIGS. 5 and 6, the safety plate shielding portion 101 is positioned adjacent and parallel to and completely covering and protecting the rear panel 302 of the electrical box 300. Thus, the safety plate 100 protects the electrical box 300 from any sharp object penetration from the rear of the electrical box 300. As a result, the combined wire support 150 and safety plate 100 provide both protection and wire support for the electrical box 300.

Figure 7:
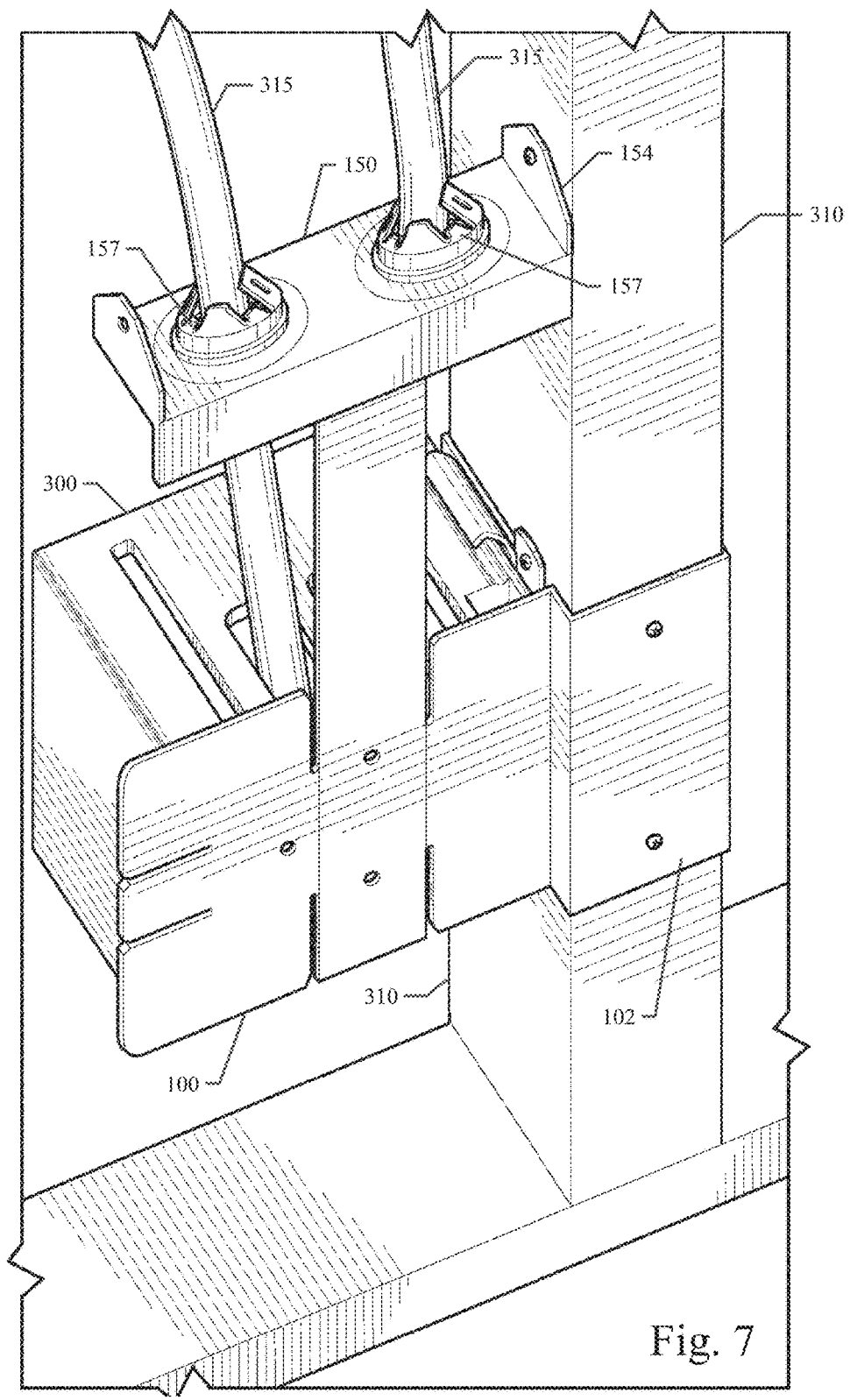
FIG. 7 illustrates another rear view showing how the combined wire support and safety plate can be coupled to a wall stud adjacent and parallel to the rear panel of an electrical box, the wire support including bushings or wire guides to retain the electrical wires inserted therein.

FIG. 7 illustrates another rear view showing how the combined wire support 150 and safety plate 100 can be coupled to a wall stud 310 adjacent and parallel to the rear panel of an electrical box 300. In the example embodiment shown in FIG. 7, the wire support 150 includes wire support knockout bushings 157 to retain the electrical wiring inserted therein. In the example embodiment, the wire support knockout bushings 157 can be implemented as bushings or wire guides fabricated from plastic, rubber, or the like. The wire support knockout bushings 157 serve to firmly retain the electrical wiring 315 within the wire support knockouts 153 without causing chafing or damage to the insulation of the electrical wiring 315.

Figure 8:
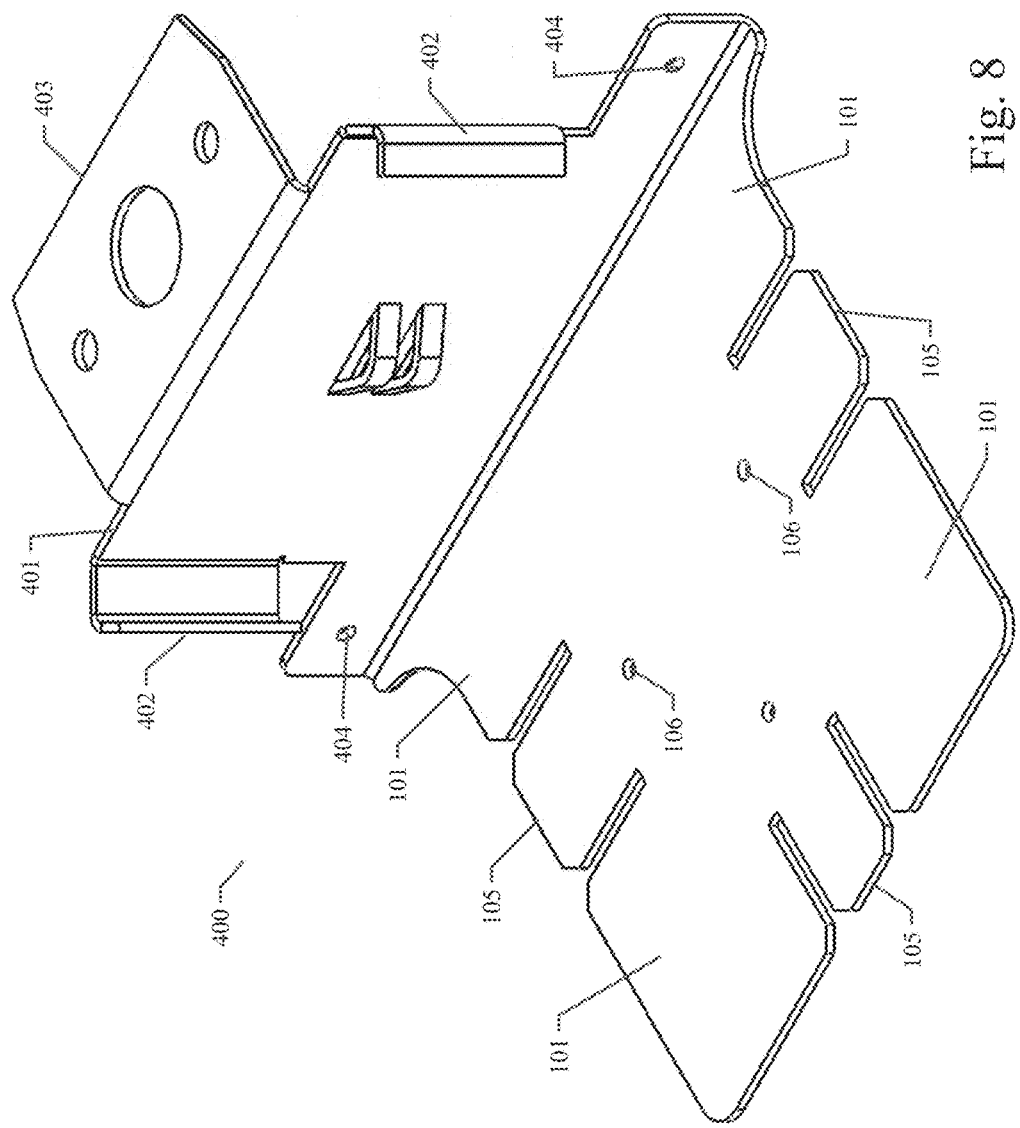
FIG. 8 illustrates a perspective top view of an alternative example embodiment of the safety plate, wherein the safety plate includes an electrical box attachment bracket.

FIG. 8 illustrates a perspective top view of an example embodiment of an alternative safety plate 400, wherein the alternative safety plate 400 includes an electrical box attachment bracket 401. The alternative safety plate 400 includes all of the components and features of the safety plate 100 described above. For example, the alternative safety plate 400 includes the safety plate shielding portion 101, the safety plate wire support attachment mechanism 105, and the safety plate wire support attachment holes 106. The electrical box attachment bracket 401 of the alternative safety plate 400 is configured to attach to a standard electrical box, such as the electrical box 300 shown in FIGS. 5 through 7. The electrical box attachment bracket 401 of the example embodiment includes alternative safety plate electrical box capture brackets 402 configured to attach to upper and lower surfaces of the electrical box 300 from the side. Thus, an electrical box 300 can be removably coupled to the alternative safety plate 400 prior to installation in a building. Then, the combined alternative safety plate 400 with the coupled electrical box 300 can be attached to a wall stud 310 using the alternative safety plate stud bracket 403 and the alternative safety plate attachment holes 404. Nails or screws can be used to attach the alternative safety plate stud bracket 403 to the wall stud 310. Nails or screws inserted into the alternative safety plate attachment holes 404 can also be used to attach the combined alternative safety plate 400 with the coupled electrical box 300 to the wall stud 310. The alternative embodiment illustrated in FIG. 8 allows the installation of a protected electrical box 300 using the alternative safety plate 400 without having to use a separate electrical box 300 attachment bracket.

FIG. 9 illustrates a flow diagram representing a sequence of operations performed in a method according to an example embodiment. In accordance with the example method 1000, the method comprises: obtaining a safety plate having a safety plate shielding portion configured to protect a rear surface of an electrical box adjacent to which the safety plate is installed, a safety plate stud bracket configured to attach to a structural element of a building, and a safety plate wire support attachment mechanism (operation 1010); obtaining a wire support having a wire support top portion including wire support knockouts, which provide an opening through which electrical wiring can be inserted and supported, and a wire support arm portion including a channel providing a wire support safety plate attachment guide configured to engage with or slide over tangs of the safety plate (operation 1020); attaching the wire support safety plate attachment guide of the wire support to the safety plate wire support attachment mechanism of the safety plate to form a combined safety plate and wire support (operation 1030); and installing the combined safety plate and wire support in a building using the safety plate stud bracket (operation 1040).

The illustrations of embodiments described herein are intended to provide a general understanding of the structure of various embodiments, and they are not intended to serve as a complete description of all the elements and features of components and systems that might make use of the structures described herein. Many other embodiments will be apparent to those of ordinary skill in the art upon reviewing the description provided herein. Other embodiments may be utilized and derived, such that structural and logical substitutions and changes may be made without departing from the scope of this disclosure. The figures herein are merely representational and may not be drawn to scale. Certain proportions thereof may be exaggerated, while others may be minimized. Accordingly, the specification and drawings are to be regarded in an illustrative rather than a restrictive sense.

The description herein may include terms, such as "up", "down", "upper", "lower", "first", "second", etc. that are used for descriptive purposes only and are not to be construed as limiting. The elements, materials, geometries, dimensions, and sequence of operations may all be varied to suit particular applications. Parts of some embodiments may be included in, or substituted for, those of other embodiments. While the foregoing examples of dimensions and ranges are considered typical, the various embodiments are not limited to such dimensions or ranges.

The Abstract is provided to allow the reader to quickly ascertain the nature and gist of the technical disclosure. The Abstract is submitted with the understanding that it will not be used to interpret or limit the scope or meaning of the claims.

In the foregoing Detailed Description, various features are grouped together in a single embodiment for the purpose of streamlining the disclosure. This method of disclosure is not to be interpreted as reflecting an intention that the claimed embodiments have more features than are expressly recited in each claim. Thus, the following claims are hereby incorporated into the Detailed Description, with each claim standing on its own as a separate embodiment.

As described herein, an apparatus and method for providing a safety plate for electrical boxes are disclosed. Although the disclosed subject matter has been described with reference to several example embodiments, it may be understood that the words that have been used are words of description and illustration, rather than words of limitation.

Changes may be made within the purview of the appended claims, as presently stated and as amended, without departing from the scope and spirit of the disclosed subject matter in all its aspects. Although the disclosed subject matter has been described with reference to particular means, materials, and embodiments, the disclosed subject matter is not intended to be limited to the particulars disclosed; rather, the subject matter extends to all functionally equivalent structures, methods, and uses such as are within the scope of the appended claims.

What is claimed is:

1. A safety apparatus to be installed adjacent to a rear surface of an electrical box, the safety apparatus comprising:
   a safety plate shielding portion to protect the rear surface of the electrical box adjacent to which the safety apparatus is installed the safety plate shielding portion having a wire support attachment mechanism;
   a safety plate stud bracket to attach to a stud, flush with drywall, or a structural element of a building; and
   a wire support removably attached to the safety plate shielding portion, the wire support having a top portion including a plurality of knockouts, each of the plurality of knockouts having an opening through which electrical wires can be inserted and supported by the wire support, the wire support also having a wire support arm portion including a safety plate attachment guide having a plurality of channels to removably slide over the wire support attachment mechanism.

2. The safety apparatus of claim 1 wherein the wire support attachment mechanism includes tangs to engage the plurality of channels of the safety plate attachment guide of the wire support.

3. The safety apparatus of claim 1 wherein the safety plate shielding portion is a double-sized safety plate.

4. The safety apparatus of claim 1 wherein the safety apparatus is fabricated from metal, thick galvanized steel, hard plastic material, or material that is resistant to penetration by a sharp object.

5. The safety apparatus of claim 1 wherein the safety plate stud bracket includes safety plate stud coupling teeth to bite into a side of a wooden stud and hold the safety apparatus in place coupled with the stud.

6. The safety apparatus of claim 1 wherein the safety apparatus includes safety plate stud anchor wings to anchor the safety apparatus to the structural element of the building.

7. The safety apparatus of claim 1 wherein the wire support top portion includes a wire support stud bracket to attach to the structural element of the building.

8. The safety apparatus of claim 1 wherein the plurality of knockouts includes bushings or wire guides.

9. The safety apparatus of claim 1 including safety plate electrical box capture brackets to attach to upper and lower surfaces of an electrical box from a side of the electrical box.

10. A method comprising:
    obtaining a safety plate shielding portion to protect a rear surface of an electrical box, the safety plate shielding portion having a wire support attachment mechanism;
    obtaining a bracket to attach to a stud, flush with drywall, or a structural element of a building;
    obtaining a wire support having a top portion including a plurality of knockouts, each of the plurality of knockouts having an opening through which electrical wires can be inserted and supported by the wire support, the wire support also having a wire support arm portion including a safety plate attachment guide having a plurality of channels; and removably sliding the safety plate attachment guide channels over the wire support attachment mechanism to removably attach the wire support to the safety plate shielding portion.

11. The method of claim 10 including installing the combined safety plate shielding portion and wire support in the building using the bracket.

\* \* \* \* \*